United States Patent
Surisetty et al.

(10) Patent No.: US 11,553,408 B2
(45) Date of Patent: Jan. 10, 2023

(54) METHOD AND USER EQUIPMENT FOR MANAGING FAILURE IN REGISTRATION FOR ACCESSING NETWORK SLICE

(71) Applicant: Samsung Electronics Co., Ltd., Suwon-si (KR)

(72) Inventors: Vijay Ganesh Surisetty, Bangalore (IN); Sivasankar Comaravelou, Bangalore (IN); Prasad Basavaraj Dandra, Bangalore (IN); Anikethan Ramakrishna Vijaya Kumar, Bangalore (IN); Debashish Deka, Bengaluru (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/232,493

(22) Filed: Apr. 16, 2021

(65) Prior Publication Data

US 2021/0329539 A1  Oct. 21, 2021

(30) Foreign Application Priority Data

Apr. 17, 2020 (IN) ............................. 202041016700
Apr. 15, 2021 (IN) ............................. 202041016700

(51) Int. Cl.
*H04W 48/16* (2009.01)
*H04W 48/18* (2009.01)
(Continued)

(52) U.S. Cl.
CPC ........... *H04W 48/16* (2013.01); *H04W 48/18* (2013.01); *H04W 60/04* (2013.01); *H04W 84/042* (2013.01)

(58) Field of Classification Search
CPC ..... H04W 48/16; H04W 48/18; H04W 60/04; H04W 84/042; H04W 36/36;
(Continued)

(56) References Cited

U.S. PATENT DOCUMENTS 10,764,951 B2  9/2020 Park et al.
2019/0029065 A1  1/2019 Park et al.
(Continued)

FOREIGN PATENT DOCUMENTS

| EP | 3544337 A1 | 9/2019 |
|---|---|---|
| WO | WO-2019-120109 A1 | 6/2019 |
| WO | WO-2019-160390 A1 | 8/2019 |

OTHER PUBLICATIONS

European Search Report dated Oct. 6, 2021, for corresponding European Patent Application No. 21168937.7.
Sharp "UE behaviour when the UE receives the rejected NSSAI for the current RA in the registration reject message and the RA is not stored"; France vol. CT WGI, No. Online Meeting ;Apr. 16, 2020.
(Continued)

*Primary Examiner* — Diane D Mizrahi
(74) *Attorney, Agent, or Firm* — Harness, Dickey & Pierce, P.L.C.

(57) ABSTRACT

A method performed by a User Equipment (UE) for managing a failure in a registration for accessing a network slice, and the UE including processing circuitry configured to perform the method, are provided. The method includes sending a registration request message to a first wireless network while the UE is in a tracking area of a registration area, the registration request message including a Single Network Slice Selection Assistance Information (S-NSSAI) corresponding to the network slice, receiving a registration reject message from the first wireless network indicating that the network slice is unavailable, storing a Tracking Area Identifier (TAI) of the tracking area to a rejected list based
(Continued)

on the TAI of the tracking area being included the registration reject message, and establishing a connection with a second wireless network in response to the receiving.

20 Claims, 8 Drawing Sheets

(51) Int. Cl.
*H04W 60/04* (2009.01)
*H04W 84/04* (2009.01)

(58) Field of Classification Search
CPC ..... H04W 88/02; H04W 36/14; H04W 48/20; H04W 36/0066; H04W 36/18; H04W 52/0248; H04W 60/00; H04W 76/18
See application file for complete search history.

(56) References Cited

U.S. PATENT DOCUMENTS

| | | |
|---|---|---|
| 2019/0254094 A1* | 8/2019 | Babu ................ H04W 76/15 |
| 2020/0137552 A1 | 4/2020 | Park et al. |
| 2020/0413241 A1 | 12/2020 | Park et al. |
| 2021/0410107 A1* | 12/2021 | Park ................ H04W 76/27 |

OTHER PUBLICATIONS

Ericsson: "NW slice-specific authentication and authorization procedure pending", France vol. CT WGI, No. Reno (NV), USA; Nov. 11, 2019.
Nokia et al: "TS 23.501 OI :4 On Rejected S-NSSAI" 3GPP Draft; France vol. SA WG2, No. Ljubljana, Slovenia.
Samsung: "Update on slice analytics from 1-15 NWDAF" Mobile Competence Centre; 650, Route Des Lucioles, France; vol. SA WG2, No. Split, Croatia.

* cited by examiner

METHOD AND USER EQUIPMENT FOR MANAGING FAILURE IN REGISTRATION FOR ACCESSING NETWORK SLICE

CROSS-REFERENCE TO RELATED APPLICATIONS

This application claims the benefit of Indian Provisional Patent Application No. 202041016700, filed on Apr. 17, 2020, in the Indian Intellectual Property Office, and Indian Patent Application No. 202041016700, filed on Apr. 15, 2021, in the Indian Intellectual Property Office, the disclosures of each of which are incorporated herein in their entirety by reference.

TECHNICAL FIELD

The present disclosure relates to wireless communication systems, and more specifically to a method and a User Equipment (UE) for managing a failure in a registration for accessing a network slice.

BACKGROUND

A network slice is a logical network and a partition of a $3^{rd}$ Generation Partnership Project (3GPP) wireless network. Network slices are created for serving a particular purpose or a set of customers. A network slice may be identified using Single Network Slice Selection Assistance Information (S-NSSAI). Accordingly, S-NSSAI may also be referred to as an S-NNSAI identifier. Also, the terms S-NNSAIs and/or NNSAI may be used herein to refer to a plurality of S-NNSAI identifiers. Various types of S-NSSAI are "configured S-NSSAI", "requested S-NSSAI", "allowed S-NSSAI", "rejected S-NSSAI for a current Public Land Mobile Network (PLMN) or Stand-alone Non-Public Network (SNPN)", "rejected S-NSSAI for a current registration area", and "a rejected S-NSSAI for a failed or revoked Network Slice-Specific Authentication and Authorization (NSSAA)". Configured S-NSSAI is S-NSSAI that is provisioned in a UE is applicable to one or more PLMNs. Requested S-NSSAI is S-NSSAI provided by the UE to a serving PLMN during a registration procedure.

Allowed S-NSSAI is S-NSSAI provided by the serving PLMN during the registration procedure. The allowed S-NSSAI indicates values of the S-NSSAI the UE could use in the serving PLMN for the current registration area. An Access and Mobility Management Function (AMF) assigns the registration area to the UE during the registration procedure. The registration area is defined as a set of tracking areas (TAs), where each tracking area consists of one or more cells that cover a geographical area. The tracking area is identified by a Tracking Area Identifier (TAI) which is broadcast in the cells of the tracking area. Rejected S-NSSAI for the current PLMN or the SNPN is S-NSSAI (e.g., the S-NSSAI included in the requested NSSAI) sent by the AMF with a rejection cause "S-NSSAI not available in the current PLMN or SNPN" to the UE.

Rejected S-NSSAI for the current registration area is S-NSSAI (e.g., the S-NSSAI included in the requested NSSAI) sent by the AMF with the rejection cause "S-NSSAI not available in the current registration area" to the UE. Rejected S-NSSAI for the failed or revoked NSSAA is S-NSSAI sent by the AMF with the rejection cause "rejected NSSAI due to the failed or revoked NSSAA" to the UE. The UE does not include the requested NSSAI in a registration message when the UE does not have the allowed S-NSSAI(s) for the current PLMN, the configured S-NSSAI(s) for the current PLMN, and default configured S-NSSAI(s).

SUMMARY

Embodiments herein provide a method and a UE for managing a failure in a registration for accessing a network slice. The method allows the UE to enable and continue a connection with a 4G network, when a request of the UE for accessing the network slice is rejected by the 5G network.

Embodiments herein provide for aborting excessive switching of the connection at the UE with the 4G network and the 5G network. Therefore, the UE will get a seamless connectivity with the 4G network, which improves a user experience. A large amount of electrical power is consumed at the UE for excessive swapping of the links (e.g., communication links). In response to aborting the excessive switching of the connection at the UE, an electric power loss at the UE may be significantly reduced using the proposed method.

Accordingly, embodiments herein provide a method performed by a User Equipment (UE) for managing a failure in a registration for accessing a network slice, the method includes sending, by the UE, a registration request message to a first wireless network while the UE is in a tracking area of a registration area, the registration request message including a Single Network Slice Selection Assistance Information (S-NSSAI) corresponding to the network slice, receiving, by the UE, a registration reject message from the first wireless network, the registration reject message indicating that the network slice is unavailable in one of the registration area, a Public Land Mobile Network (PLMN), or a Stand-alone Non-Public Network (SNPN), storing, by the UE, a Tracking Area Identifier (TAI) of the tracking area to a rejected list based on the TAI of the tracking area being included the registration reject message, and establishing, by the UE, a connection with a second wireless network in response to the receiving.

In embodiments, where the method includes disabling, by the UE, a N1 mode in response to the establishing, initiating, by the UE, a timer in response to the establishing, determining, by the UE, whether the UE is located in the tracking area, and performing, by the UE, one of, enabling the N1 mode after an expiry of the timer in response to determining that the UE is located in the tracking area, or terminating the timer and enabling the N1 mode in response to determining that the UE is located in another tracking area.

In embodiments, where the establishing includes disabling, by the UE, a N1 mode, initiating, by the UE, a timer, establishing, by the UE, the connection with the second wireless network, and enabling, by the UE, the N1 mode after an expiry of the timer.

In embodiments, where the method includes searching, by the UE, for a new tracking area according to a periodic time interval.

In embodiments, where the registration reject message comprises an instruction to disable a N1 mode of the UE.

In embodiments, where the method includes detecting, by the UE, a reset condition, wherein the reset condition is one of a change in a UE policy, a timer based retry, a Universal Subscriber Identity Module (USIM) removal from the UE, a restart of the UE, movement by the UE to a new tracking area, or a user triggered action, terminating, by the UE, the timer in response to detecting the reset condition, deleting, by the UE, the TAI from the rejected list in response to detecting the reset condition, and enabling, by the UE, the N1 mode in response to detecting the reset condition.

In embodiments, the storing stores a plurality of TAIs corresponding to all tracking areas of the registration area based on the TAI of the tracking area being included in the registration reject message, the TAI of the tracking area being one of the plurality of TAIs.

In embodiments, where the storing comprises determining, by the UE, that all network slices in the first wireless network are rejected based on the registration reject message including one cause among "S-NSSAI not available in a current PLMN or SNPN", "S-NSSAI not available in a current registration area" or "S-NSSAI not available due to a failed or revoked Network Slice-Specific Authentication and Authorization (NSSAA)", and the rejected list is available to a Non-Access Stratum (NAS) and an Access Stratum (AS) corresponding to the UE.

Accordingly, embodiments herein provide the UE for managing the failure in the registration for accessing the network slice. The UE includes processing circuitry configured to send a registration request message to a first wireless network while the UE is in a tracking area of a registration area, the registration request message including a Single Network Slice Selection Assistance Information (S-NSSAI) corresponding to the network slice, receive a registration reject message from the first wireless network, the registration reject message indicating that the network slice is unavailable in one of the registration area, a Public Land Mobile Network (PLMN), or a Stand-alone Non-Public Network (SNPN), store a Tracking Area Identifier (TAI) of the tracking area to a rejected list based on the TAI of the tracking area being included the registration reject message, and establish a connection with a second wireless network in response to receiving the registration reject message.

These and other aspects of embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of embodiments herein without departing from the spirit thereof, and embodiments herein include all such modifications.

BRIEF DESCRIPTION OF FIGURES

Embodiments are illustrated in the accompanying drawings, throughout which like reference letters indicate corresponding parts in the various figures. Embodiments herein will be better understood from the following description with reference to the drawings, in which.

DETAILED DESCRIPTION

Figure 1:
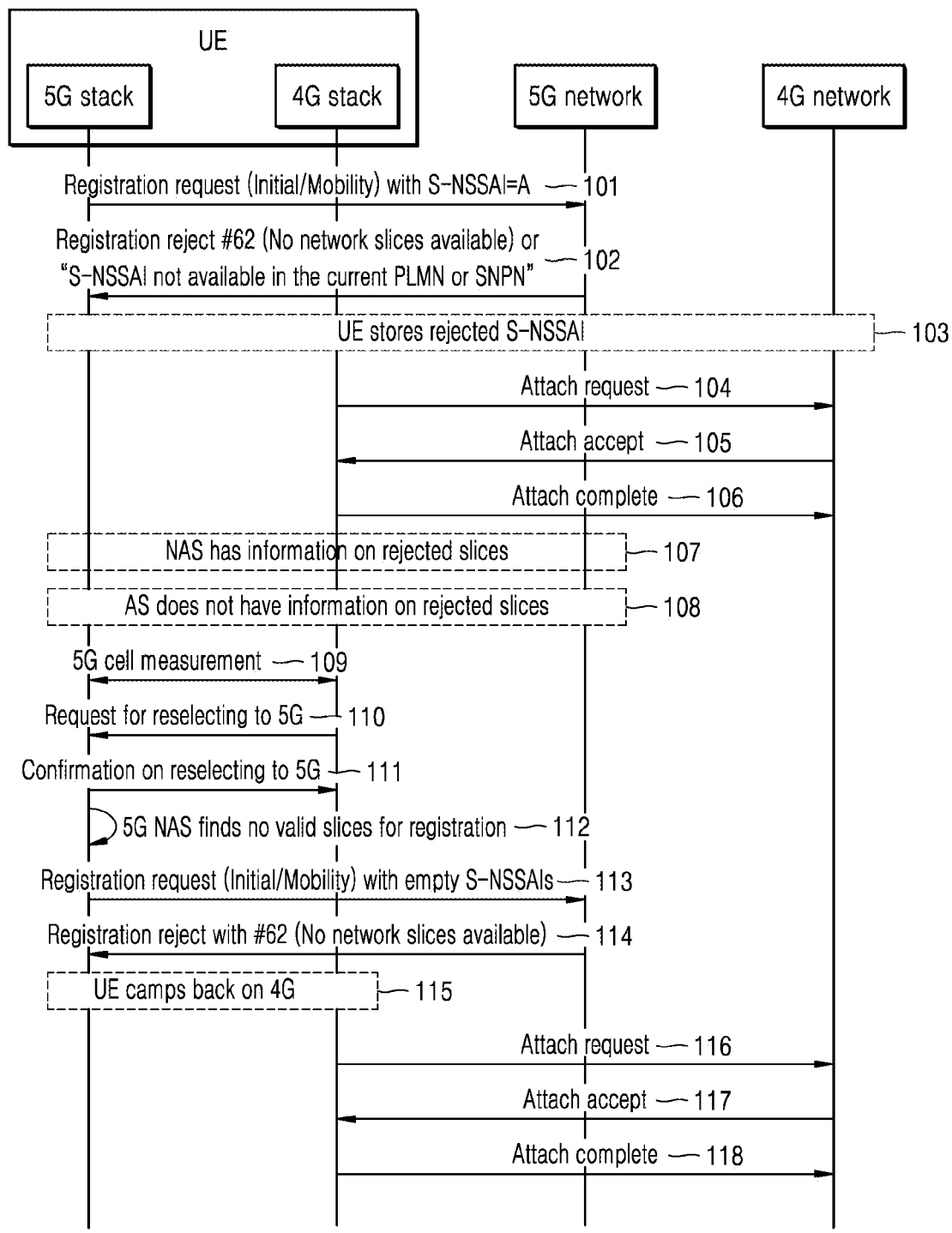
FIGS. 1-3 are sequential diagrams illustrating signaling of a UE with wireless networks for managing a failure in a registration for accessing a network slice.

Embodiments herein and the various features and advantageous details thereof are explained more fully with reference to the non-limiting examples that are illustrated in the accompanying drawings and detailed in the following description. Descriptions of well-known components and processing techniques are omitted so as to not unnecessarily obscure embodiments herein. Also, various embodiments described herein are not necessarily mutually exclusive, as embodiments can be combined with one or more other embodiments to form new embodiments. The term "or" as used herein, refers to a non-exclusive or, unless otherwise indicated. The examples used herein are intended merely to facilitate an understanding of ways in which embodiments herein can be practiced and to further enable those skilled in the art to practice embodiments herein. Accordingly, the examples should not be construed as limiting the scope of embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. In embodiments, each block may be physically separated into two or more interacting and discrete blocks without departing from the scope of the disclosure. Likewise, in embodiments, the blocks may be physically combined into more complex blocks without departing from the scope of the disclosure.

Accordingly, embodiments herein provide a method for managing a failure in a registration for accessing a network slice at a UE. The method includes sending, by the UE in a tracking area of a registration area, a registration request message comprising S-NSSAI(s) to a first wireless network for accessing the network slice. The method includes receiving, by the UE, a registration reject message from the first wireless network, wherein the registration reject message indicates that the network slice corresponds to the S-NSSAI(s) are unavailable in one of: the registration area, a PLMN, and an SNPN. The method includes storing, by the UE, the TAI of the tracking area in the registration reject message to a rejected list, where the stored rejected list is available to a NAS and an AS. The method includes establishing, by the UE, a connection with a second wireless network.

Accordingly, embodiments herein provide the UE for managing the failure in the registration for accessing the network slice. The UE includes a registration message controller, a memory, a processor, where the registration message controller is coupled to the memory and the processor. The registration message controller is configured to send the registration request message comprising the S-NSSAI(s) to the first wireless network for accessing the network slice, where the UE is in the tracking area of the registration area. The registration message controller is configured to receive the registration reject message from the first wireless network, where the registration reject message indicates that the network slice corresponds to the S-NSSAI(s) are unavailable in one of: the registration area, the PLMN, and the SNPN. The registration message controller is configured to store the TAI of the tracking area in the registration reject message to the rejected list, where the stored rejected list is available to the NAS and the AS. The registration message controller is configured to establish the connection with the second wireless network.

Unlike existing methods and systems, the proposed method allows the UE to establish a connection with a 4G network (e.g., the second wireless network) for a time period, when a request of the UE for accessing the network slice is rejected by the 5G network (e.g., the first wireless network). Further, the UE aborts excessive switching of the connection at the UE with the 4G network and the 5G network until expiry of the time period. Therefore, the UE will get a seamless connectivity with the 4G network, which improves a user experience. The excessive switching of the connection at the UE consumes a large amount of electric power of the UE. In response to aborting the excessive switching of the connection at the UE, an electric power loss at the UE may be significantly reduced using the proposed method.

Figure 2:
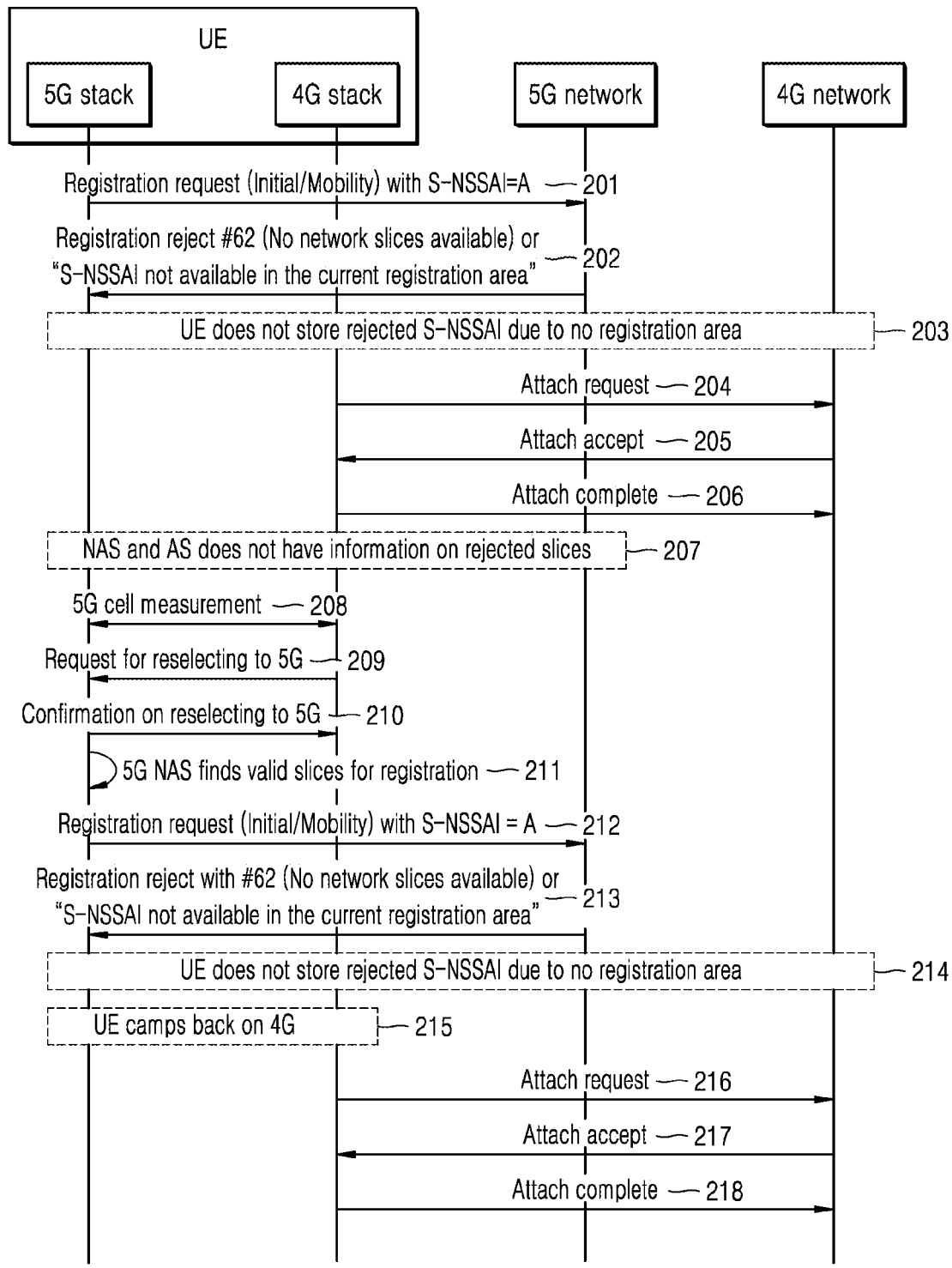
Figure 3:
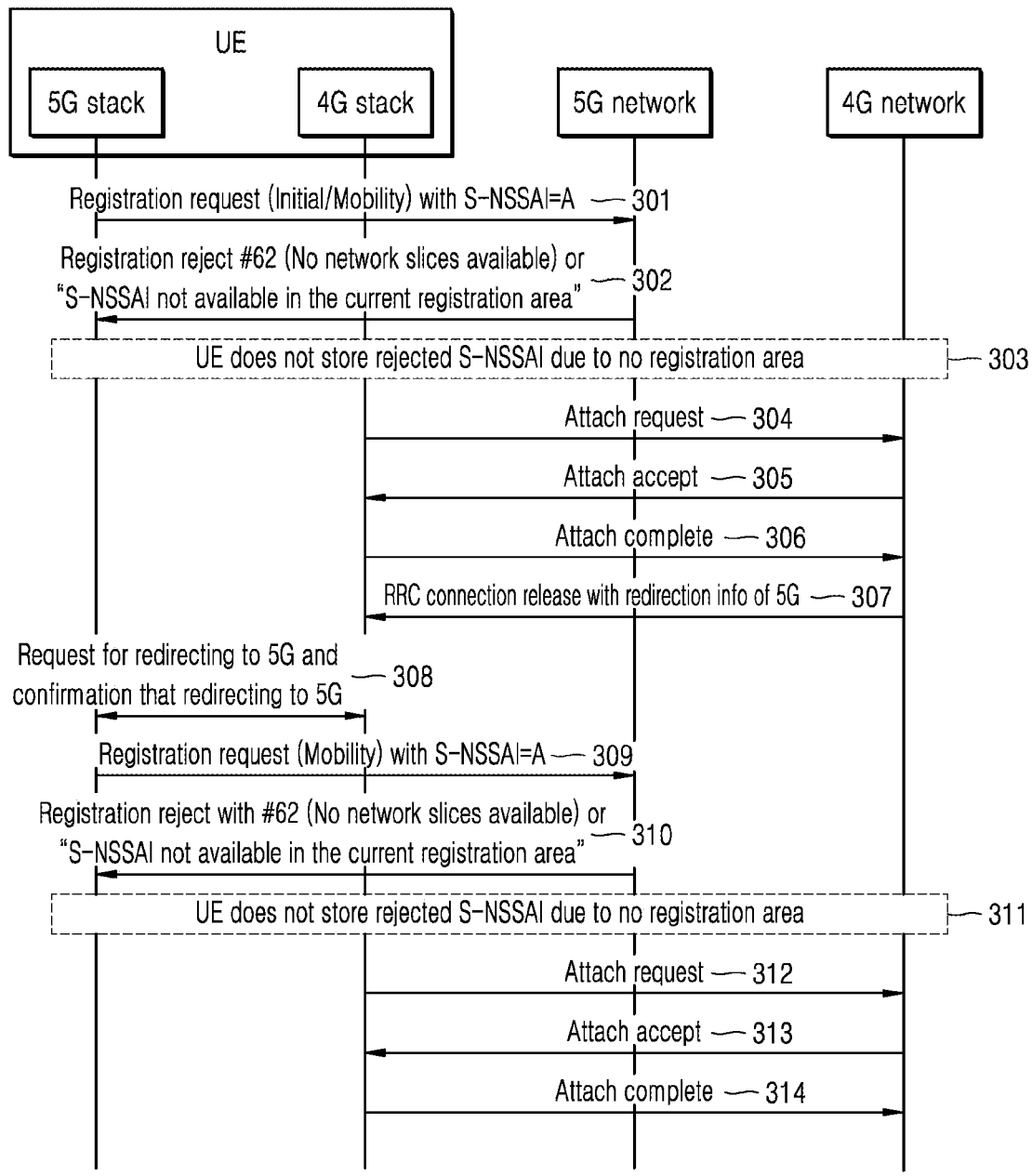

FIGS. 1-3 are sequential diagrams illustrating signaling of a UE with the wireless network (e.g., $5^{th}$ Generation (5G) network and $4^{th}$ Generation (4G) network) for managing a failure in a registration for accessing the network slice. The UE includes a 5G stack and a 4G stack for enabling communication of the UE with the 5G network and the 4G network, respectively.

An example scenario is explained using FIG. 1. The 5G stack sends (101) an initial/mobility registration request with the S-NSSAI of 'A' to the 5G network for accessing the network slice. The 5G network validates a subscription of the UE for this particular network slice and deems that this network slice is not allowed for the UE. Further, the 5G network sends (102) a registration reject message with a Fifth Generation System Mobility Management (5GMM) cause #62 (No network slices available) or "S-NSSAI not available in the current PLMN or SNPN" to the UE.

The UE stores (103) the rejected S-NSSAI to a rejected list. Further, the UE establishes (104-106, e.g., sends an attach request message 104, receives an attach accept message 105, and sends an attach complete message 106) a connection with the 4G network. The Non-Access Stratum (NAS) (107) has the information of the rejected slices, whereas the Access Stratum (AS) (108) does not have the information of the rejected slices. Therefore, once the connection with the 4G network is established, the 4G stack configures the UE for performing 5G cell measurements. Further, the 5G stack performs (109) the 5G cell measurements, receives a request (110) for reselecting to the 5G network from the 4G stack, and confirms (111) that the UE will reselect to the 5G network. The UE detects (112) that no valid slices are available for the registration from the NAS. Even though no valid S-NSSAI is available, UE is still allowed to perform (113) the registration procedure without including any requested S-NSSAI as per 3GPP specification.

The 5G network rejects (114) the registration request of the UE with any suitable cause (e.g. #62: No network slices available). Further, the UE camps back (115) to the 4G network and establishes (116-118, e.g., sends an attach request message 116, receives an attach accept message 117, and sends an attach complete message 118) the connection with the 4G network. Further, the operations (107-118) keep repeating in the UE, and the connection of the UE switches in between the 5G network and the 4G network which causes a battery drain and a frequent loss of services at the UE.

Another example scenario is explained using FIG. 2. The 5G stack sends (201) the initial/mobility registration request with the S-NSSAI of 'A' to the 5G network for accessing the network slice. The 5G network validates the subscription of the UE for this particular network slice and deems that this network slice is not allowed for the UE. Further, the 5G network sends (202) the registration reject message with the 5GMM cause #62 (No network slices available) or "S-NSSAI not available in the current registration area" to the UE. The registration area for the UE is defined only after a successful registration. So after any registration reject, the 'Registration Area' will be invalid in the UE. Since the registration area of the UE is not defined in the 5G network due to the registration reject, the UE does not store (203) the S-NSSAI in the rejected list.

Further, the UE establishes (204-206, e.g., sends an attach request message 204, receives an attach accept message 205, and sends an attach complete message 206) the connection with the 4G network. Both the NAS and the AS (207) do not have the information of the rejected slices. Therefore, once the connection with the 4G network is established, the 4G stack configures the UE for performing the 5G cell measurements. Further, the 5G stack performs (208) the 5G cell measurements, receives a request (209) for reselecting to the 5G network from the 4G stack, and confirms (210) that the UE will reselect to the 5G network. The UE assumes (211) that valid slices are still available for the registration from the NAS due to not storing the S-NSSAI in the rejected list. Further, the UE initiates (212) the registration procedure by including the same rejected S-NSSAI, or a similar S-NSSAI, in the registration request message.

The 5G network rejects (213) the registration request of the UE with the same 5GMM cause, or a similar 5GMM cause, #62 (no network slices available) or "S-NSSAI not available in the current registration area". The registration area for the UE is defined only after the successful registration. So after any registration reject, the 'Registration Area' will be invalid in UE. Since the registration area of the UE is not defined in the 5G network due to the registration reject, the UE does not store (214) the S-NSSAI in the rejected list. Further, the UE camps back (215) to the 4G network and establishes (216-218, e.g., sends an attach request message 216, receives an attach accept message 217, and sends an attach complete message 218) the connection with the 4G network. Further, the operations (207-218) keep repeating in the UE, and the connection of the UE switches in between the 5G network and the 4G network which causes the battery drain and the frequent loss of services at the UE.

Another example scenario is explained using FIG. 3. The 5G stack sends (301) the initial/mobility registration request with the S-NSSAI of 'A' to the 5G network for accessing the network slice. Further, the 5G network sends (302) the registration reject message with the 5GMM cause #62 (No network slices available) or "S-NSSAI not available in the current registration area" to the UE. The registration area for the UE is defined only after the successful registration. So after any registration reject, the 'Registration Area' will be invalid in the UE. Since the registration area of the UE is not defined in the 5G network due to the registration reject, the UE does not store (303) the S-NSSAI in the rejected list.

Further, the UE establishes (304-306, e.g., sends an attach request message 304, receives an attach accept message 305, and sends an attach complete message 306) the connection with the 4G network. Further, the 4G network sends (307) a RRC connection release request with a redirection info of 5G to the 4G stack. Further, the 4G stack configures the UE to redirect (308) the connection from the 4G to the 5G network. The UE initiates (309) the registration procedure by including the same S-NSSAI (e.g., S-NSSAI=A), or a similar S-NSSAI, in the registration request message.

Further, the 5G network sends (310) the registration reject message with the 5GMM cause #62 (No network slices available) or "S-NSSAI not available in the current PLMN or SNPN" to the UE (e.g., the same 5GMM cause or a similar 5GMM cause). Since the registration area of the UE is not defined in the 5G network due to the registration reject, the UE does not store (311) the S-NSSAI in the rejected list. Further, the UE camps back to the 4G network and establishes (312-314, e.g., sends an attach request message 312, receives an attach accept message 313, and sends an attach complete message 314) the connection with the 4G network. Further, the operations (307-314) keep repeating at the UE, and the connection of the UE switches in between the 5G network and the 4G network which causes the battery drain and the frequent loss of services at the UE. Thus, it is desired to provide a useful alternative.

Referring now to the drawings, and more particularly to FIGS. 4A through 8, there are shown embodiments.

Figure 4A:
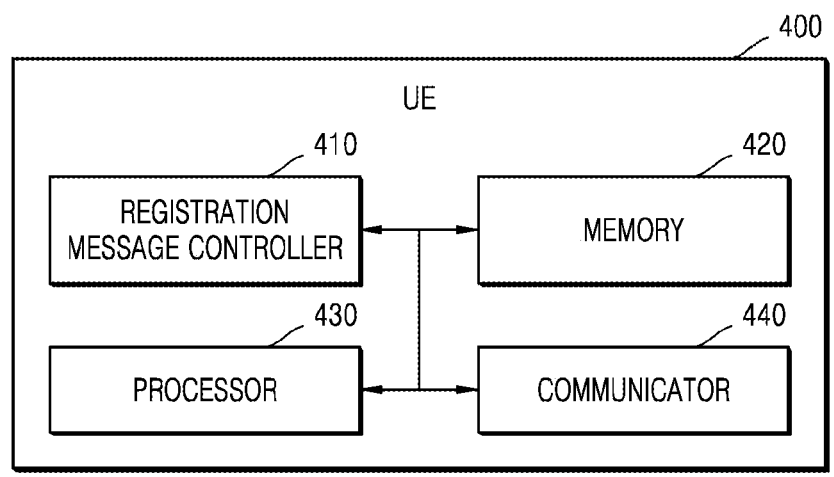
FIG. 4A is a block diagram of the UE for managing the failure in the registration for accessing the network slice, according to embodiments as disclosed herein.

FIG. 4A is a block diagram of a UE (400) for managing a failure in a registration for accessing a network slice, according to embodiments as disclosed herein. Examples of the UE (400) include, but not limited to a smart phone, a tablet computer, a Personal Digital Assistance (PDA), a desktop computer, an Internet of Things (IoT) device, a wearable device, etc. In embodiments, the UE (400) may include a registration message controller (410), a memory (420), a processor (430), and/or a communicator (440). The registration message controller (410) may be operably coupled to the memory (420) and the processor (430). The registration message controller (410) may be implemented by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, logic gates, integrated circuits, microprocessors, microcontrollers, memory circuits, passive electronic components, active electronic components, optical components, hardwired circuits, a central processing unit (CPU), an arithmetic logic unit (ALU), a digital signal processor, a microcomputer, a field programmable gate array (FPGA), a System-on-Chip (SoC), a programmable logic unit, application-specific integrated circuit (ASIC), etc., and may optionally be driven by a firmware. The circuits may, for example, be embodied in one or more semiconductor chips, or on substrate supports such as printed circuit boards and the like. Also, according to embodiments, operations described herein as being performed by the UE (400), the processor (430) and/or the communicator (440) may be performed by processing circuitry.

The registration message controller (410) may be configured to send a registration request message including S-NSSAI(s) to a first wireless network (100) for accessing the network slice, where the UE (400) is located in a tracking area of a PLMN. An example of the first wireless network (100) is a 5G network. The registration message controller (410) may be configured to receive a registration reject message from the first wireless network (100). In embodiments, the registration reject message may be a deregistration request. The registration reject message indicates to the UE (400) that the network slice corresponding to the S-NSSAI(s) is/are unavailable in the registration area or a PLMN, or a SNPN.

In embodiments, the registration reject message includes an instruction to disable, or limit, a N1 mode of the UE (400). The N1 mode is a mode of the UE (400) allowing access to the 5G network via a 5G access network. In embodiments, when the UE (400) does not have a valid registration area, the rejected S-NSSAI(s) from the current registration area is/are applicable to the tracking area on (e.g., in) which the registration reject message was received by the UE (400). The valid registration area may include at least one TAI, where the UE (400) receives information on the valid registration area during a registration accept message from the first wireless network (100). The registration message controller (410) may be configured to store a TAI of the tracking area in (e.g., corresponding to) the registration reject message to (e.g., in) a rejected list, where the stored rejected list is available to a NAS and an AS. In embodiments, the registration message controller (410) may be configured to maintain a new "forbidden N1 TAI for rejected Network Slice Selection Assistance Information (NSSAI)" list in the rejected list to store the TAI, where the NSSAI includes a set of S-NSSAI. The registration message controller (410) may be configured to start a timer after an entry is added in to the "forbidden N1 TAI for rejected Network Slice Selection Assistance Information (NSSAI)" list. According to embodiments, the registration message controller (410) may store all TAIs corresponding to the registration area of a specific TAI included in the registration reject message in the "forbidden N1 TAI for rejected Network Slice Selection Assistance Information (NSSAI)" list. Further, the registration message controller (410) may be configured to delete the entries in the "forbidden N1 TAI for rejected Network Slice Selection Assistance Information (NSSAI)" list due to an expiry of the timer.

In embodiments, the registration message controller (410) may be configured to determine that all possible network slices in the first wireless network (100) are rejected based on one of the following causes: "S-NSSAI not available in a current PLMN or SNPN," "S-NSSAI not available in a current registration area" and/or "S-NSSAI not available due to a failed or revoked Network Slice-Specific Authentication and Authorization (NSSAA)" by the first wireless network (100) based on the registration reject message. Further, the registration message controller (410) may be configured to store the TAI in the registration reject message to the rejected list. The registration message controller (410) may be configured to establish a connection with a second wireless network (200). An example of the second wireless network (200) is a 4G network. In embodiments, the registration message controller (410) may be configured to disable, or limit, the N1 mode, upon storing the TAIs. Further, the registration message controller (410) may be configured to initiate the timer for a period (e.g., 10 minutes). In this case, the current TAIs or stored TAIs are blocked locally for a period of time by the NAS of the UE, and the current TAIs or stored TAIs are shared to the AS of the UE, so that the AS never selects them to camp on. Further, the registration message controller (410) may be configured to establish the connection with the second wireless network (200). The registration message controller (410) may be configured to enable the N1 mode after an expiry of the timer. The timer expires after completing the period.

In embodiments, the registration message controller (410) may be configured to disable, or limit, the N1 mode, in response to establishing the connection with the second wireless network (200). Further, the registration message controller (410) may be configured to initiate the timer (e.g., in response to storing the TAI and/or establishing the connection with the second wireless network). Further, the registration message controller (410) may be configured to determine whether the UE (400) is (e.g., has) moved to a new tracking area. The registration message controller (410) may be configured to enable the N1 mode after the expiry of the timer, in response to determining that the UE (400) is located in the new tracking area. The registration message controller (410) may be configured to terminate the timer, and enable the N1 mode, in response to determining that the UE (400) is located in another tracking area.

In embodiments, the registration message controller (410) may be configured to detect a reset condition for terminating the timer. The reset condition may be a change in a UE policy and/or subscription, a timer based retry (e.g., resetting timer, or the UE (400) retries periodically after a timer expiry), a Universal Subscriber Identity Module (USIM) removal from the UE (400), a restart of the UE (400), a change in the TAI (e.g., a determination that the UE (400) has moved to a new tracking area), and/or a user triggered action. An example for the change in the UE policy/subscription: when the user recharges for a service again (e.g., for a service previously charged), then the UE's subscription information may change. Further, the UE (400) may now (following the user recharge of the service) be allowed to access the slice. An example for the user triggered action: when the user manually selects the 5G network from a manual search option, the UE (400) may try registration on that network even though the UE (400) has stored a 5G PLMN & tracking area in the rejected list. Further, the registration message controller (410) may be configured to terminate the timer upon detecting the reset condition. Further, the registration message controller (410) may be configured to delete the TAI and/or the registration reject message from the rejected list (e.g., the "forbidden N1 TAI for rejected NSSAI" list). Further, the registration message controller (410) may be configured to enable the N1 mode. In embodiments, the registration message controller (410) may be configured to search for new tracking area(s) of the registration area in periodic time interval(s) (e.g., 5 minutes) using a background activity, or information of another USIM in the UE (400), and not limited to these examples. According to embodiments, the registration message controller (410) may be configured to establish a connection with the first wireless network (100) in response to the enabling of the N1 mode, for example, by resending the registration request message including the S-NSSAI(s) to the first wireless network (100) for accessing the network slice. According to embodiments, the resending of the registration request message may result in successful registration for access to the network slice. According to embodiments, the UE (400) may generate signals for (e.g., encode, modulate, decode, demodulate, etc.), and perform, communication (e.g., a voice call, a data communication, etc.) with another device (e.g., another UE, a base station, etc.) via the connection with the first wireless network (100) and/or the network slice.

The memory (420) may include (e.g., store) the rejected list. The memory (420) may store the TAI. The memory (420) may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM). In addition, the memory (420) may, in some examples, be considered a non-transitory storage medium. The term "non-transitory" may indicate that the storage medium is not embodied in a carrier wave or a propagated signal. However, the term "non-transitory" should not be interpreted that the memory (420) is non-movable. In some examples, the memory (420) may be configured to store larger amounts of information than the memory (420). In certain examples, a non-transitory storage medium may store data that may, over time, change (e.g., in Random Access Memory (RAM) or cache).

The processor (430) may be configured to execute instructions stored in the memory (420). The processor (430) may be a general-purpose processor, such as a Central Processing Unit (CPU), an Application Processor (AP), a graphics-only processing unit such as a Graphics Processing Unit (GPU) and/or a Visual Processing Unit (VPU), and/or the like. The processor (430) may include multiple cores to execute the instructions. The communicator (440) may be configured to communicate internally between hardware components in the UE (400). Further, the communicator (440) may be configured to facilitate the communication between the UE (400) and the first and second wireless networks (100, 200). The communicator (440) may include an electronic circuit specific to a standard that enables wired and/or wireless communication.

Although the FIG. 4A shows the hardware components of the UE (400), it is to be understood that embodiments are not limited thereon. In embodiments, the UE (400) may include less or more components. Further, the labels or names of the components are used only for illustrative purpose and do not limit the scope of embodiments. One or more components may be combined together to perform same function, or substantially similar functions, for managing the failure in the registration for accessing the network slice.

Figure 4B:
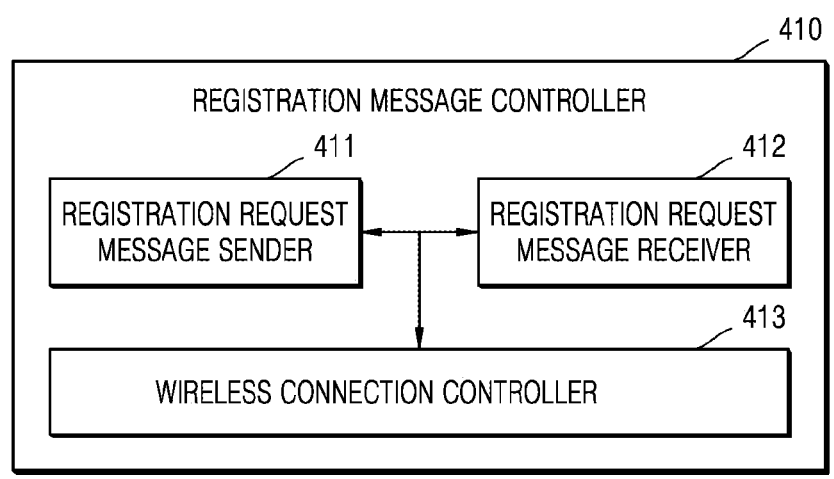
FIG. 4B is a block diagram of a registration message controller of the UE for establishing a connection with a second wireless network due to the failure in the registration for accessing the network slice, according to embodiments as disclosed herein.

FIG. 4B is a block diagram of the registration message controller (410) of the UE (400) for establishing the connection with the second wireless network (200) due to the failure in the registration for accessing the network slice, according to embodiments as disclosed herein. In embodiments, the registration message controller (410) may include a registration request message sender (411), a registration request message receiver (412), and/or a wireless connection controller (413). The registration request message sender (411), the registration request message receiver (412), and/or the wireless connection controller (413) may implemented by processing circuitry, such as logic gates, integrated circuits, microprocessors, microcontrollers, memory circuits, passive electronic components, active electronic components, optical components, hardwired circuits, and/or the like, and may optionally be driven by a firmware. The circuits may, for example, be embodied in one or more semiconductor chips, or on substrate supports such as printed circuit boards and the like.

The request message sender (411) may send the registration request message including the S-NSSAI(s) to the first wireless network (100) for accessing the network slice. The registration request message receiver (412) may receive the registration reject message from the first wireless network (100). The registration request message receiver (412) may store the TAI of the tracking area in the registration reject message to the rejected list of (e.g., stored in) the memory (420), where the stored rejected list is available to the NAS and the AS. In embodiments, the registration request message receiver (412) may determine that all possible network slices in the first wireless network (100) are rejected based on causes including "S-NSSAI not available in the current PLMN or SNPN", "S-NSSAI not available in the current registration area" and/or "S-NSSAI not available due to the failed or revoked NSSAA" by the first wireless network (100) based on the registration reject message. Further, the registration request message receiver (412) may store the TAI to the rejected list, where the stored rejected list is available to the NAS and the AS. The wireless connection controller (413) may establish the connection with the second wireless network (200).

In embodiments, the wireless connection controller (413) may disable, or limit, the N1 mode, upon storing the TAI. Further, the wireless connection controller (413) may initiate the timer for the period (e.g., 10 minutes). Further, the wireless connection controller (413) may establish the connection with the second wireless network (200). The wireless connection controller (413) may enable the N1 mode after the expiry of the timer.

In embodiments, the wireless connection controller (413) may disable, or limit, the N1 mode, in response to establishing the connection with the second wireless network (200). Further, the wireless connection controller (413) may initiate the timer. Further, the wireless connection controller (413) may determine whether the UE (400) is (e.g., has) moved to the new tracking area. The wireless connection controller (413) may enable the N1 mode after the expiry of the timer, in response to determining that the UE (400) is located in the tracking area. The wireless connection controller (413) may terminate the timer, and enable the N1 mode, in response to determining that the UE (400) is located in another tracking area.

In embodiments, the wireless connection controller (413) may detect the reset condition for terminating the timer. Further, the wireless connection controller (413) may terminate the timer upon detecting the reset condition. Further, the wireless connection controller (413) may delete the TAI and/or the registration reject message from the rejected list. Further, the wireless connection controller (413) may enable the N1 mode. In embodiments, the wireless connection controller (413) may search for the new tracking areas in periodic time intervals.

Although the FIG. 4B shows the hardware components of the registration message controller (410), it is to be understood that embodiments are not limited thereon. In embodiments, the registration message controller (410) may include less or more components. Further, the labels or names of the components are used only for illustrative purpose and do not limit the scope of embodiments. One or more components may be combined together to perform same function, or substantially similar functions, for establishing the connection with the second wireless network (200) due to the failure in the registration for accessing the network slice.

Figure 5:
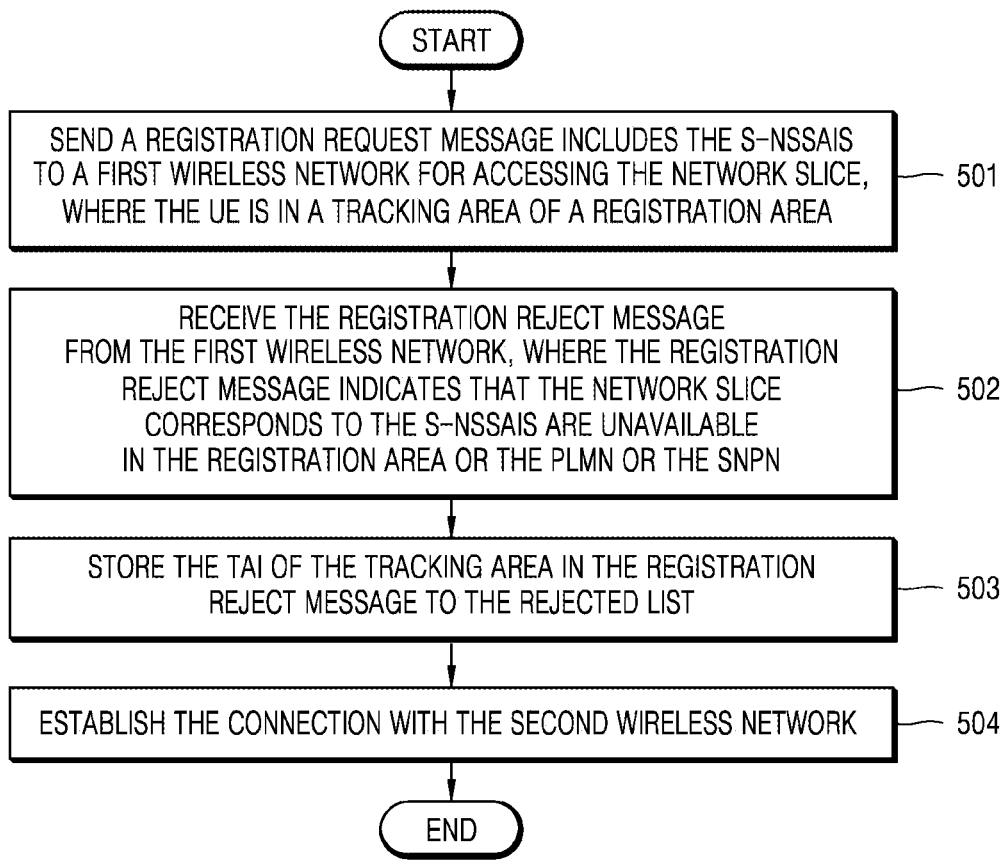
FIG. 5 is a flow diagram illustrating a method for managing the failure in the registration for accessing the network slice by the UE, according to embodiments as disclosed herein.

FIG. 5 is a flow diagram 500 illustrating a method for managing the failure in the registration for accessing the network slice by the UE (400), according to embodiments as disclosed herein. At operation 501, the method may include sending the registration request message including the S-NSSAI(s) to the first wireless network (100) for accessing the network slice, where the UE (400) is in the tracking area of the registration area. In embodiments, the method allows the registration request message sender (411) to send the registration request message including the S-NSSAI(s) to the first wireless network (100) for accessing the network slice, where the UE (400) is in the tracking area of the registration area. At operation 502, the method may include receiving the registration reject message from the first wireless network (100), where the registration reject message indicates that the network slice corresponding to the S-NSSAI(s) is/are unavailable in the registration area or the PLMN or the SNPN.

In embodiments, the method allows the registration request message receiver (412) to receive the registration reject message from the first wireless network (100), where the registration reject message indicates that the network slice corresponding to the S-NSSAI(s) are unavailable in the registration area or the PLMN or the SNPN. At operation 503, the method may include storing the TAI of the tracking area in the registration reject message to the rejected list, where the stored rejected list is available to the NAS and the AS. In embodiments, the method allows the registration request message receiver (412) to store the TAI of the tracking area in the registration reject message to the rejected list. At operation 504, the method may include establishing the connection with the second wireless network (200). In embodiments, the method allows the wireless connection controller (413) to establish the connection with the second wireless network (200). According to embodiments, the UE (400) may generate signals for (e.g., encode, modulate, decode, demodulate, etc.), and perform, communication (e.g., a voice call, a data communication, etc.) with another device (e.g., another UE, a base station, etc.) via the connection with the second wireless network (200).

The various actions, acts, blocks, operations, or the like in the flow diagram 500 may be performed in the order presented, in a different order, or simultaneously or contemporaneously. Further, in embodiments, some of the actions, acts, blocks, operation, or the like may be omitted, added, modified, skipped, or the like without departing from the scope of embodiments.

Figure 6:
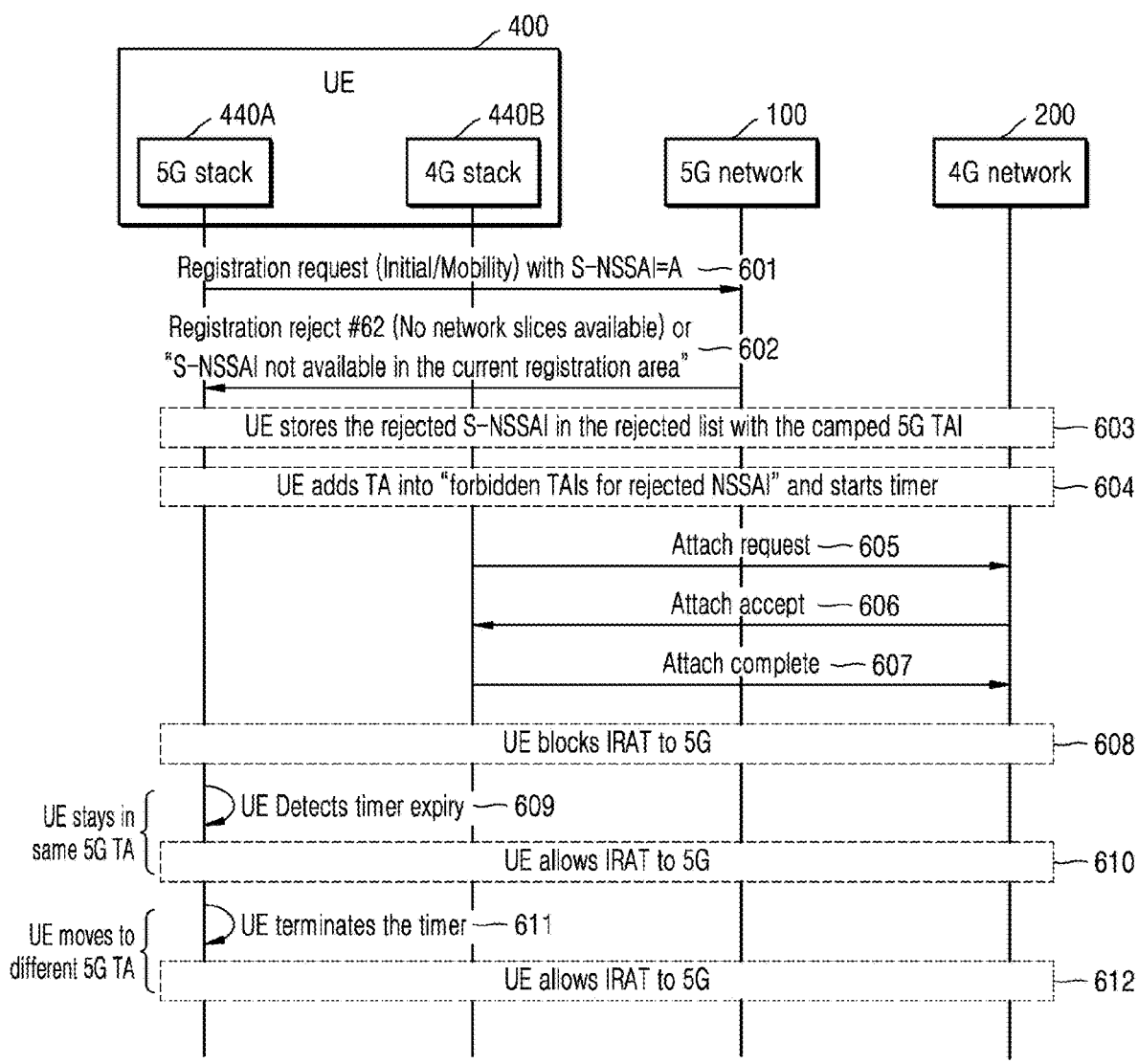
FIG. 6 is a sequential diagram illustrating signaling of the UE with the wireless networks for managing the failure in the registration due to a UE triggered idle mode Inter Radio Access Technology (IRAT) without a storage of a rejected S-NSSAI(s), according to embodiments as disclosed herein.

FIG. 6 is a sequential diagram illustrating signaling of a UE (400) with the wireless networks (100, 200) for managing the failure in the registration due to a UE triggered idle mode IRAT without a storage of the rejected S-NSSAI(s), according to embodiments as disclosed herein. The UE (400) may include a 5G stack (440A) and a 4G stack (440B) for enabling communication of the UE (400) with the 5G network (100) and the 4G network (200), respectively. According to embodiments, operations described herein as being performed by the 5G stack (440A) and/or the 4G stack (440B) may be performed using processing circuitry. The 5G stack (440A) may send (601) an initial/mobility registration request (e.g., the registration request message) with the S-NSSAI=A to the 5G network (100) for accessing the network slice, where the UE (400) is located in the Tracking Area (TA) of the PLMN. The 5G network (100) may detect that the UE (400) does not have an allowed S-NSSAI(s) for the current PLMN, a configured S-NSSAI(s) for the current PLMN, and/or a default configured S-NSSAI(s). Further, the 5G network (100) may send (602) the registration reject message with a 5GMM cause #62 (e.g., No network slices are available) or "S-NSSAI not available in the current PLMN or SNPN" (or "S-NSSAI not available in the current registration area") to the UE (400). The UE (400) may store (603) the rejected S-NSSAI to the rejected list with the camped 5G TAI. Further, the UE (400) may add (604) the TAI into "forbidden TAIs for rejected NSSAI" list of the rejected list and start the timer.

The "forbidden TAIs for rejected NSSAI" list is a new list that is not defined in 3GPP specifications. The "forbidden TAIs for rejected NSSAI" list is also shared to the AS. The AS may consider any TAIs present in the "forbidden TAIs for rejected NSSAI" list as unsuitable for camping for normal service. Further, the UE (400) may establish (605-607, e.g., send an attach request message 605, receive an attach accept message 606, and send an attach complete message 607) the connection with the 4G network (200). The UE (400) may block or limit an (608) Inter Radio Access Technology (IRAT) handover to the 5G network (100) until the UE (400) detects the expiry of the timer or a change in the TA. Consider, an example in which the UE (400) stays in the Tracking Area (TA) and detects (609) the expiry of the timer. In this example, the UE (400) may allow/unblock (610) the IRAT handover to the 5G network (100) from the 4G network (200). Consider, another example in which the UE (400) moves to another TA. In this example, the UE (400) may terminate (611) the timer and allow/unblock (612) the IRAT handover to the 5G network (100) from the 4G network (200).

Unlike existing methods and systems, the proposed method allows the UE (400) to camp on the 4G network (200) until the expiry of the timer or the change in the TA after receiving the registration reject message. Moreover, the UE (400) does not initiate excessive reselections to the 5G network (100) and a registration procedure until the expiry of the timer or the change in the TA, which reduces an electric power loss at the UE. Further, the proposed method enables a seamless connectivity between the UE (400) and the 4G network (200), which improves a user experience.

Figure 7:
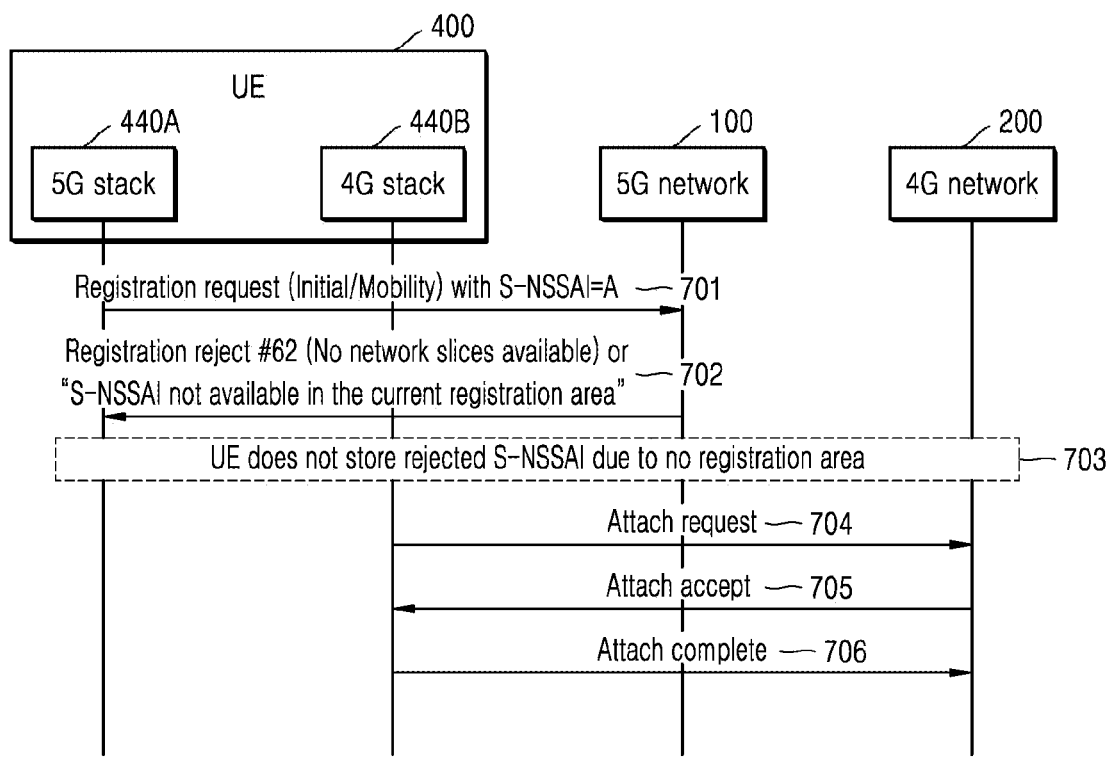
FIG. 7 is a sequential diagram illustrating signaling of the UE with the wireless networks for managing the failure in the registration due to a UE triggered idle mode IRAT with the storage of the rejected S-NSSAI(s), according to embodiments as disclosed herein.

FIG. 7 is a sequential diagram illustrating signaling of the UE (400) with the wireless networks (100, 200) for managing the failure in the registration due to the UE triggered idle mode IRAT with the storage of the rejected S-NSSAI(s), according to embodiments as disclosed herein. The 5G stack (440A) may send (701) the initial/mobility registration request (e.g., the registration request message) with the S-NSSAI=A to the 5G network (100) for accessing the network slice, where the UE (400) is located in the TA of the PLMN. The 5G network (100) may detect that the UE (400) does not have the allowed S-NSSAI(s) for the current PLMN, the configured S-NSSAI(s) for the current PLMN, and/or the default configured S-NSSAI(s). Further, the 5G network (100) may send (702) the registration reject message with the 5GMM cause #62 (e.g., No network slices are available) or "S-NSSAI not available in the current registration area" to the UE (400). The UE (400) may store (703) the rejected S-NSSAI to the rejected list with the camped 5G TAI. Further, the UE (400) may mark the TA as an invalid registered area into the rejected list for the current registration area. Thus, the UE (400) may maintain the knowledge that the current TAI has no valid S-NSSAI(s). Further, the UE (400) may establish (704-706, e.g., send an attach request message 704, receive an attach accept message 705, and send an attach complete message 706) the connection with the 4G network (200). The UE (400) may not initiate excessive reselections to the 5G network (100) and the registration procedure until changing the TA, which reduces the electric power loss at the UE (400) and provides the seamless connectivity to the UE (400).

The AS of the UE (400) corresponding to the first wireless network (100) may use the "forbidden TAIs for rejected NSSAI" list in all conditions (e.g., various ways of the UE (400) coming from the 4G network to the 5G network, e.g., reselection, redirection, handover, cell selection, etc.) for suspending the IRAT procedures including idle mode reselection, redirection, and/or handover until the expiry of the timer. Therefore, the UE (400) may not disable, or limit, the N1 mode for aborting the IRAT procedures. Upon expiry of the timer, the TAIs stored in the "forbidden TAIs for rejected NSSAI" list may be deleted by the UE (400). Further, the UE (400) may initiate the IRAT procedures and the registration.

Figure 8:
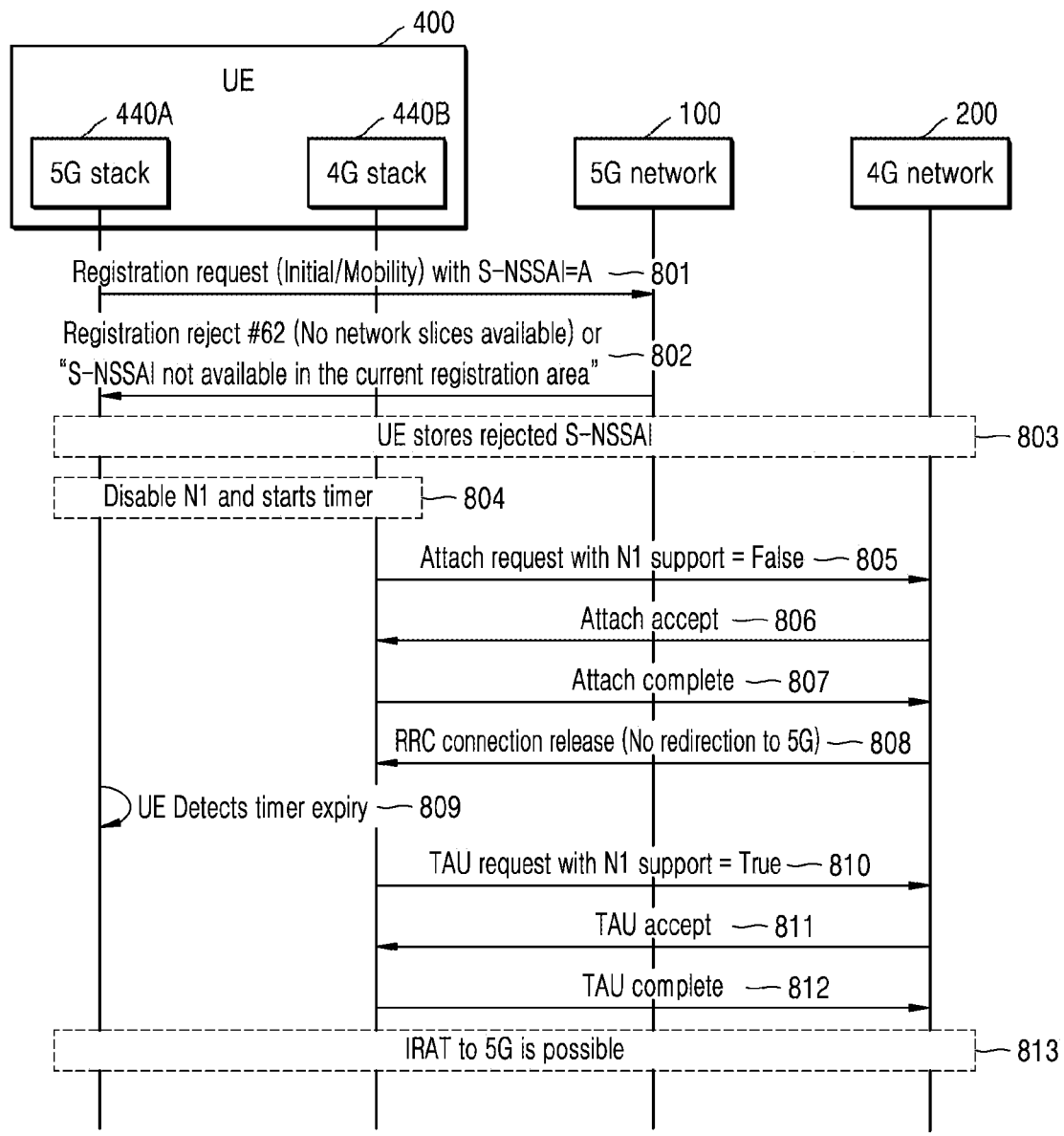
FIG. 8 is a sequential diagram illustrating signaling of the UE with the wireless networks for managing the failure in the registration due to a network triggered IRAT without the storage of the rejected S-NSSAI(s), according to embodiments as disclosed herein.

FIG. 8 is a sequential diagram illustrating signaling of the UE (400) with the wireless networks (100, 200) for managing the failure in the registration due to a network triggered IRAT without the storage of the rejected S-NSSAI(s), according to embodiments as disclosed herein. The 5G stack (440A) may send (801) the initial/mobility registration request (e.g., the registration request message) with the S-NSSAI=A to the 5G network (100) for accessing the network slice, where the UE (400) is located in the TA of the PLMN. The 5G network (100) may detect that the UE (400) does not have the allowed S-NSSAI(s) for the current PLMN, the configured S-NSSAI(s) for the current PLMN, and/or the default configured S-NSSAI(s). Further, the 5G network (100) may send (802) the registration reject message with the 5GMM cause #62 (e.g., No network slices are available) or the "S-NSSAI not available in the current PLMN or SNPN" to the UE (400). The UE (400) may store (803) the rejected S-NSSAI to the rejected list with the camped 5G TAI. Further, the UE (400) may identify (e.g., determine) that all the requested S-NSSAI(s) were rejected in the current TA by the 5G network (100). Therefore, the UE (400) may disable, or limit, (804) the N1 mode and initiate the timer as long as the UE (400) is operating in the same TA or a similar TA. Further, when the N1 mode is disabled or limited, the UE (400) may not measure and reselect to any 5G cell.

Further, the UE (400) may reselect (805-807, e.g., send an attach request message with N1 support=False 805, receive an attach accept message 806, and send an attach complete message 807) the 4G network (200) and perform the registration procedure, where the UE (400) may indicate to the 4G network (200) that the N1 mode is disabled, or limited, during the registration procedure (805). Further, the UE (400) may establish the connection with the 4G network (200). The 4G network (200) may send (808) a RRC connection release to the UE (400) for instructing UE (400) not to redirect or handover to the 5G network (100). Later the timer may expire and the UE (400) may detect (809) the expiry of the timer. Further, the UE (400) may enable the N1 mode and send (810) a Tracking Area Update (TAU) request to the 4G network (200) that indicates the N1 mode is enabled. Further, the 4G network (200) may perform a TAU procedure (811-812, e.g., receive a TAU accept message 811 and send a TAU complete message 812) and allow/unblock (813) the UE (400) for the IRAT handover to the 5G network (100) from the 4G network (200). The UE (400) may be permitted to re-attempt the registration for the network slice.

Unlike existing methods and systems, the proposed method allows the UE (400) to camp on the 4G network (200) until enabling the N1 mode at the UE (400). Therefore, the UE (400) may not initiate excessive reselections to the 5G network (100) and the registration procedure until enabling the N1 mode, which reduces the electric power loss at the UE. Further, the proposed method enables the seamless connectivity between the UE (400) and the 4G network (200), which improves the user experience.

In embodiments, the method of disabling, or limiting, and enabling the N1 mode based on the timer may be used alternatively for the scenarios where "S-NSSAI not available in the current registration area" along with detecting a new TAC/registration area(s) and enabling N1 related procedures.

Upon receiving a registration reject message corresponding to a requested S-NSSAI from a 5G network, conventional UEs connect to a 4G network and, upon connecting to the 4G network reattempt to connect to the S-NSSAI on the 5G network. The conventional UEs fail to use the knowledge of the received registration reject message to prevent or reduce further connection attempts to the same S-NSSAI or similar S-NSSAIs. Accordingly, the conventional UEs perform excessive switching between 4G and 5G networks, resulting in excessive resource consumption (e.g., power, processor, memory, etc.) and/or loss of service.

However, embodiments provide an improved UE the uses the knowledge of the received registration reject message to prevent or reduce further connection attempts to the same S-NSSAI or similar S-NSSAIs. For example, the improved UE may disable, or limit, access to the 5G network for a period of time, until the UE moves to a new tracking area, or until detection of a reset condition. Accordingly, the improved UE overcomes the deficiencies of the conventional UEs to avoid or reduce excessive switching between 4G and 5G networks, and thus reduce resource consumption (e.g., power, processor, memory, etc.), and/or avoid or limit losses of service.

The foregoing description of embodiments will so fully reveal the general nature of embodiments herein that others can, by applying current knowledge, readily modify and/or adapt embodiments for various applications without departing from the generic concept, and, therefore, such adaptations and modifications should and are intended to be comprehended within the meaning and range of equivalents of embodiments. It is to be understood that the phraseology or terminology employed herein is for the purpose of description and not of limitation. Therefore, those skilled in the art will recognize that embodiments herein can be practiced with modification within the scope of embodiments as described herein.

We claim:

1. A method performed by a User Equipment (UE) for managing a failure in a registration for accessing a network slice, the method comprising:
   sending, by the UE, a registration request message to a first wireless network while the UE is in a tracking area of a registration area, the registration request message including a Single Network Slice Selection Assistance Information (S-NSSAI) corresponding to the network slice;
   receiving, by the UE, a registration reject message from the first wireless network, the registration reject message indicating that the network slice is unavailable in one of the registration area, a Public Land Mobile Network (PLMN), or a Stand-alone Non-Public Network (SNPN);
   storing, by the UE, a Tracking Area Identifier (TAI) of the tracking area to a rejected list based on the TAI of the tracking area being included the registration reject message; and
   establishing, by the UE, a connection with a second wireless network in response to the receiving.

2. The method as claimed in claim 1, wherein the method comprises:
   disabling, by the UE, a N1 mode in response to the establishing;
   initiating, by the UE, a timer in response to the establishing;
   determining, by the UE, whether the UE is located in the tracking area; and
   performing, by the UE, one of,
      enabling the N1 mode after an expiry of the timer in response to determining that the UE is located in the tracking area, or
      terminating the timer and enabling the N1 mode in response to determining that the UE is located in another tracking area.

3. The method as claimed in claim 2, wherein the method comprises:
   detecting, by the UE, a reset condition, wherein the reset condition is one of a change in a UE policy, a timer based retry, a Universal Subscriber Identity Module (USIM) removal from the UE, a restart of the UE, movement by the UE to a new tracking area, or a user triggered action;
   terminating, by the UE, the timer in response to detecting the reset condition;
   deleting, by the UE, the TAI from the rejected list in response to detecting the reset condition; and
   enabling, by the UE, the N1 mode in response to detecting the reset condition.

4. The method as claimed in claim 1, wherein the establishing, comprises:
   disabling, by the UE, a N1 mode;
   initiating, by the UE, a timer;
   establishing, by the UE, the connection with the second wireless network; and
   enabling, by the UE, the N1 mode after an expiry of the timer.

5. The method as claimed in claim 2, wherein the method comprises:
   establishing, by the UE, a connection with the first wireless network by resending the registration request message to the first wireless network and successfully registering for access to the network slice; and
   performing, by the UE, a voice call or a data communication with another device via the connection with the first wireless network.

6. The method as claimed in claim 1, wherein the method comprises searching, by the UE, for a new tracking area according to a periodic time interval.

7. The method as claimed in claim 1, wherein the registration reject message comprises an instruction to disable a N1 mode of the UE.

8. The method as claimed in claim 1, wherein the storing stores a plurality of TAIs corresponding to all tracking areas of the registration area based on the TAI of the tracking area being included in a registration accept message, the TAI of the tracking area being one of the plurality of TAIs.

9. The method as claimed in claim 1, wherein
   the storing comprises determining, by the UE, that all network slices in the first wireless network are rejected based on the registration reject message including one cause among "S-NSSAI not available in a current PLMN or SNPN", "S-NSSAI not available in a current registration area" or "S-NSSAI not available due to a failed or revoked Network Slice-Specific Authentication and Authorization (NSSAA)"; and the rejected list is available to a Non-Access Stratum (NAS) and an Access Stratum (AS) corresponding to the UE.

10. The method as claimed in claim 1, wherein the method comprises:

performing, by the UE, a voice call or a data communication with another device via the connection with the second wireless network.

11. A User Equipment (UE) for managing a failure in a registration for accessing a network slice, comprising:

processing circuitry configured to, send a registration request message to a first wireless network while the UE is in a tracking area of a registration area, the registration request message including a Single Network Slice Selection Assistance Information (S-NSSAI) corresponding to the network slice, receive a registration reject message from the first wireless network, the registration reject message indicating that the network slice is unavailable in one of the registration area, a Public Land Mobile Network (PLMN), or a Stand-alone Non-Public Network (SNPN), store a Tracking Area Identifier (TAI) of the tracking area to a rejected list based on the TAI of the tracking area being included the registration reject message, and establish a connection with a second wireless network in response to receiving the registration reject message.

12. The UE as claimed in claim 11, wherein the processing circuitry is configured to:

disable a N1 mode, in response to establishing the connection with the second wireless network;

initiate a timer in response to establishing the connection with the second wireless network;

determine whether the UE is located in the tracking area; and perform one of, enabling the N1 mode after an expiry of the timer in response to determining that the UE is located in the tracking area, or terminating the timer and enabling the N1 mode in response to determining that the UE is located in another tracking area.

13. The UE as claimed in claim 11, wherein the processing circuitry is configured to establish the connection with the second wireless network, including:

disabling a N1 mode;

initiating a timer;

establishing the connection with the second wireless network; and enabling the N1 mode after an expiry of the timer.

14. The UE as claimed in claim 11, wherein the processing circuitry is configured to search for a new tracking area according to a periodic time interval.

15. The UE as claimed in claim 11, wherein the registration reject message comprises an instruction to disable a N1 mode of the UE.

16. The UE as claimed in claim 12, wherein the processing circuitry is configured to:

detect a reset condition, wherein the reset condition is one of a change in a UE policy, a timer based retry, a Universal Subscriber Identity Module (USIM) removal from the UE, a restart of the UE, movement by the UE to a new tracking area, or a user triggered action;

terminate the timer in response to detecting the reset condition;

delete the TAI from the rejected list in response to detecting the reset condition; and enable the N1 mode in response to detecting the reset condition.

17. The UE as claimed in claim 11, wherein the processing circuitry is configured to store a plurality of TAIs corresponding to all tracking areas of the registration area based on the TAI of the tracking area being included in a registration accept message, the TAI of the tracking area being one of the plurality of TAIs.

18. The UE as claimed in claim 11, wherein the processing circuitry is configured to store the TAI of the tracking area to the rejected list, including determining that all network slices in the first wireless network are rejected based on the registration reject message including one cause among "S-NSSAI not available in a current PLMN or SNPN", "S-NSSAI not available in a current registration area" or "S-NSSAI not available due to a failed or revoked Network Slice-Specific Authentication and Authorization (NSSAA)"; and the rejected list is available to a Non-Access Stratum (NAS) and an Access Stratum (AS) corresponding to the UE.

19. The UE as claimed in claim 11, wherein the processing circuitry is configured to perform a voice call or a data communication with another device via the connection with the second wireless network.

20. The UE as claimed in claim 11, wherein the processing circuitry is configured to:

establish a connection with the first wireless network by resending the registration request message to the first wireless network and successfully registering for access to the network slice; and perform a voice call or a data communication with another device via the connection with the first wireless network.

* * * * *